Oct. 2, 1951 B. J. VAN HARDENBERG 2,570,013

FREQUENCY DISCRIMINATOR

Filed June 17, 1949 2 Sheets-Sheet 1

INVENTOR
BONIFACIUS JOHANNES V. HARDENBERG
BY Fred M Vogel
AGENT

INVENTOR
BONIFACIUS JOHANNES V. HARDENBERG
BY Fred M Vogel
AGENT

Patented Oct. 2, 1951

2,570,013

UNITED STATES PATENT OFFICE 2,570,013

FREQUENCY DISCRIMINATOR

Bonifacius Johannes van Hardenberg, Eindhoven, Netherlands, assignor to Hartford National Bank and Trust Company, Hartford, Conn., as trustee Application June 17, 1949, Serial No. 99,752
In the Netherlands July 16, 1948

7 Claims. (Cl. 250—36)

In practice there is a need for a device which supplies an indicating voltage whose polarity varies according to the sign of a frequency difference between any alternating voltage and a pulse-shaped voltage or a higher harmonic thereof. Such a comparison frequency discriminator may be used with particular advantage for frequency measurement or frequency control.

This invention has for its object to provide simple means for producing such an indicating voltage, when the said alternating voltage has a sawtooth waveform. As will be set out hereinafter, the device according to the invention may also be employed, if the said alternating voltage is, for example, sinusoidal, the sine voltage being first converted into a sawtooth voltage, as may be effected in a variety of ways known per se.

Such a frequency discriminator according to the present invention is characterized by the series combination of means for producing a sawtooth beat voltage at the difference frequency to be indicated and a differentiating network, from the output circuit of which the indication voltage is taken.

The said means for producing the sawtooth beat voltage may be constituted by devices known per se from the communication art for pulse-phase demodulation relatively to a sawtooth voltage and of the kind described, for example, in U. S. Patent No. 2,471,168, issued May 24, 1949. Thus, for example, use may be made of a pulse modulator for causing the sawtooth voltage to amplitude-modulate the pulses, the modulation being followed by a low-pass filter for the amplitude-modulated pulses, the low-pass filter preferably forming part of a peak detector.

According to a further feature of the invention a rectified indicating voltage, whose polarity varies with the sign of the frequency difference, is obtained from the output of a push-pull peak detector connected to the differentiating network.

In order that the invention may be more clearly understood and readily carried into effect, one example will now be described with reference to the accompanying drawing, of which Fig. 1 shows the block schematic diagram of a device according to the invention, the operation of which is described more fully with reference to the voltage-time diagrams shown in Figs. 2 to 5;

Figure 1:
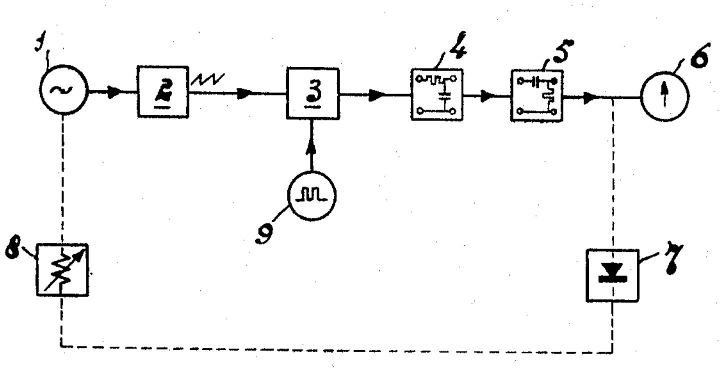

Referring to Fig. 1, an oscillator 1 produces a sine voltage, the divergence of the frequency of which voltage with respect to the frequency of a component of the spectrum of a pulse-like voltage produced by an oscillator 9 is required to be indicated with its correct polarity.

The sine voltage of oscillator 1 is used for synchronising a sawtooth generator 2, the output voltage of which is fed as a modulating voltage, to a pulse modulator 3 for the amplitude-modulation of the pulses taken from the pulse generator 9.

In Figs. 2*a* and 2*b* are shown the sawtooth voltage and the pulse-like voltage which are fed to the pulse modulator 3, it being assumed for the sake of simplicity that the fundamental frequencies of the two voltages are nearly equal.

In Fig. 2*c* are shown the amplitude-modulated pulses taken from the output circuit of the pulse modulator 3. It is evident therefrom that the envelope of the modulated pulses exhibits a sawtooth variation, the frequency of this sawtooth beat voltage corresponding to the difference of the fundamental frequencies of the sawtooth and pulse-like voltages fed to the modulator 3. The pulse repetition frequency of the pulses shown in Fig. 2*b* is slightly smaller than the fundamental frequency of the sawtooth voltage shown in Fig. 2*a*, so that the envelope of the modulated pulses, as shown in Fig. 2*c*, is similar in shape to the sawtooth voltage shown in Fig. 2*a*.

Figs. 3*a*, 3*b* and 3*c* show the relationships produced if the pulse repetition frequency, or a higher harmonic thereof, is slightly higher than the frequency of the sawtooth input voltage to the mixing stage 3. The pulse-like voltage shown in Fig. 2*b* has a repetition frequency such that double its value slightly exceeds the frequency of the sawtooth voltage shown in Fig. 2*a*.

It should be emphasised that the foregoing and the following also applies to higher harmonics and, in the event of a sufficiently short pulse even to very high harmonics, for example the 250th harmonic of the pulse repetition frequency.

Figures 2, 3:
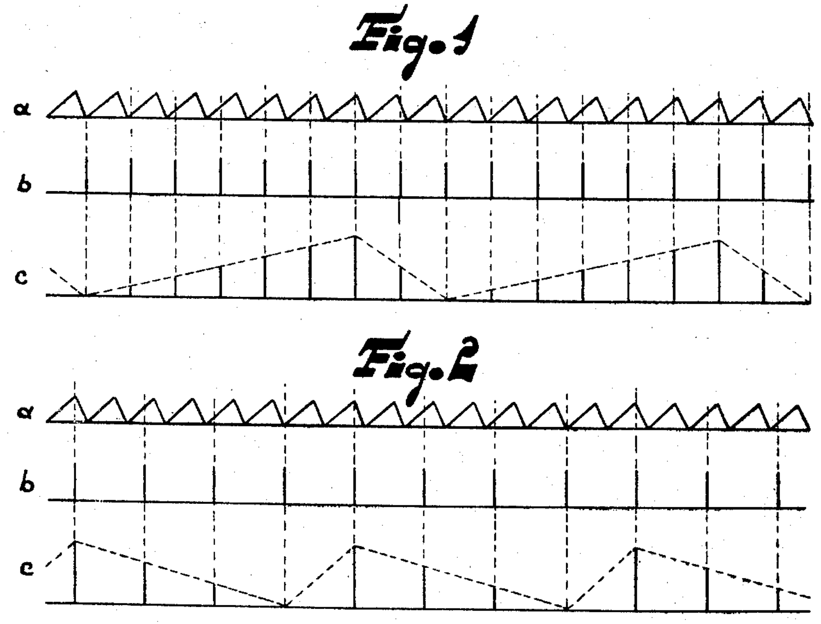

By mixing the voltages shown in Figs. 3*a* and 3*b*, amplitude-modulated pulses are produced, the envelope of which shows a sawtooth variation the frequency of which corresponds to the frequency difference between the sawtooth voltage shown in Fig. 3*a* and the first harmonic of the pulse-like voltage shown in Fig. 3*b*. However, the shape of the sawtooth beat voltage shown in Fig. 3*c* diverges from that of the sawtooth beat voltage shown in Fig. 2c, since the sign of the frequency difference of the voltages fed to the mixing stage 3 is now opposite. With the frequency ratios shown in Fig. 3 a sawtooth beat voltage is produced, which is a mirror image, with respect to the ordinate, of that shown in Fig. 2c.

Figure 4:
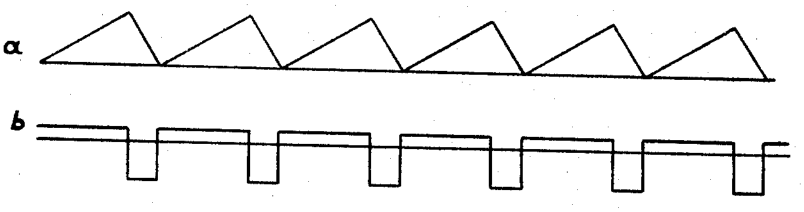
Figure 5:
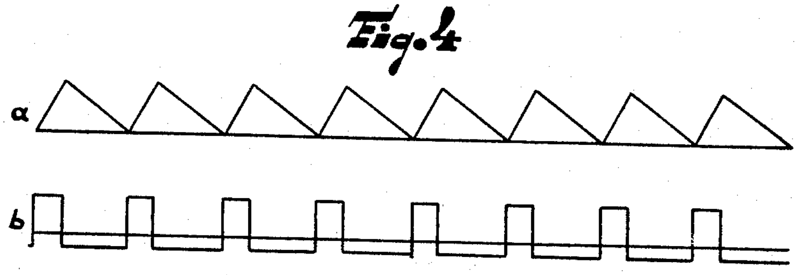

Figs. 4a and 5a show the sawtooth beat voltages corresponding to Figs. 2c and 3c respectively to a reduced time scale, it being assumed that, by smoothing with the use of a low-pass filter 4 following the mixing stage 3, the pulse repetition frequency and higher harmonics thereof are eliminated from the mixed voltage.

By differentiation of the beat voltages shown in Figs. 4a and 5a with the use of a differentiaing network 5, there are produced in the one case negative pulses and in the other case positive pulses, as shown in Figs. 4b and 5b, said pulses indicating by their polarity the sign of the frequency difference required to be known.

As shown in Fig. 1, this indicating voltage is fed to an indicator 6 which is operative to indicate the polarity of the pulses. Obviously, the indicating voltage obtained may be utilized, for example subsequent to rectification with the use of a detector 7, for controlling the value of a controllable reactance 8, which is coupled to the frequency-determining circuit of the oscillator 1 for automatic correction of the oscillator frequency, according to the pulse repetition frequency or a higher harmonic thereof.

Figures 6, 7:
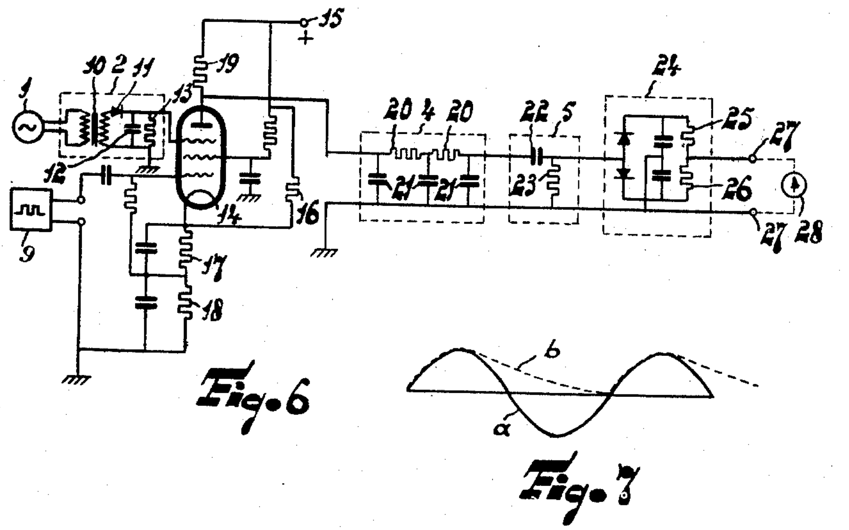
Fig. 6 is a detail circuit diagram of the device.
Fig. 7 shows a voltage-time diagram to explain the manner of converting a sine voltage into a sawtooth voltage, according to the circuit of Fig. 6.

In Figure 6, reference numerals 1 and 9 similarly designate an oscillator for a sine voltage and an oscillator for a pulse-like voltage respectively. The sine voltage from oscillator 1 is fed to a converter 2 to produce a sawtooth voltage, said converter comprising a transformer 10 and a half-wave rectifier 11 which is connected thereto and which includes an output resistance 13 shunted by a smoothing condenser 12.

The time constant of the smoothing filter 12, 13 is chosen to be smaller than one period of the sine voltage supplied, so that, in the manner shown in Fig. 7, the sawtooth voltage b, shown in dotted lines in Fig. 7, is produced from the sine voltage a.

The sawtooth voltage taken from the converter 2 and the pulse-like voltage of the oscillator 9 are fed to a pentode 14, used as a mixing tube, which is normally cut off by a highly negative grid bias voltage applied to the first control-grid. This bias voltage is taken from a potentiometer comprising a resistance 16 connected to the positive terminal 15 of an anode voltage source, not shown in the diagram and cathode resistances 17 and 18. The pentode 14 is periodically gated by the pulses supplied thereto, each time passing an anode current which varies with the instantaneous value of the sawtooth voltage fed to the second control-grid. Thus amplitude-modulated pulses, as shown in Figs. 2c and 3c, are developed across the anode resistance 19 of the mixing tube. The output voltage of the mixing stage is fed through a low-pass filter 4, having a cut-off frequency corresponding, for example, to half the frequency interval between successive components of the spectrum of the pulse-like voltage and comprising series resistances 20 and by-pass condensers 21, to a differentiating network 5 comprising a series condenser 22 and an output resistance 23. Set up across this output resistance 23 and varying with the sign of the frequency difference between the compared voltages are negative or positive voltage pulses, as shown in Figs. 4b and 5b. As shown in Fig. 6, this voltage is fed to a push-pull peak detector 24 having oppositely connected output resistances 25, 26, so that a negative or positive rectified indicating voltage is produced across the output terminals of the push-pull peak detector, in accordance with the sign of the frequency differences to be indicated. This rectified indicating voltage may be fed to a direct current instrument 28 having a central zero position, which thus provides a visual indication of the sign of the frequency difference.

In the embodiment shown in Fig. 6, the low-pass filter 4 produces a material damping of the beat voltage fed thereto. This disadvantage may be obviated by including a peak detector in the anode circuit of the mixing tube 14, this detector being connected, for example, by means of a coupling condenser, to the anode circuit of the mixing tube.

It is obvious that the differentiating network for the sawtooth beat voltage may be constituted not only by the resistance-capacitance network shown but also by other differentiating networks, for example, a differentiating network comprising a resistance and an inductance.

Finally, it should be noted that in the embodiment shown in Fig. 6 the differentiating network 5 and the push-pull peak detector 24 may, if desired, be shunted by a high ohmic resistance, as far as it is of interest, in the case of synchronism of the compared frequencies, to produce an output voltage varying with the phase relation of the compared voltage, as may be particularly important for control purposes.

What I claim is:

1. Apparatus for producing an output voltage whose polarity depends on the sign of the frequency difference between a saw tooth voltage and a component in the harmonic spectrum of a periodic pulsatory voltage comprising means to combine said saw tooth voltage and said pulsatory voltage to produce a saw tooth wave whose frequency corresponds to the difference in frequency between said saw tooth voltage and said component, a differentiating network, and means to apply said saw tooth wave to said network to produce said output voltage.

2. Apparatus for producing an output voltage whose polarity depends on the sign of the frequency difference between a saw tooth voltage and a component in the harmonic spectrum of a periodic pulsatory voltage comprising a pulse modulator to combine said saw tooth voltage with said pulsatory voltage to produce resultant pulses which are amplitude modulated by a saw tooth wave whose frequency corresponds to the difference in frequency between said saw tooth voltage and said component, a low-pass filter coupled to the output of said pulse modulator for extracting solely said saw tooth wave therefrom, a differentiating network, and means to apply said saw tooth wave to said network to produce said output voltage.

3. Apparatus, as set forth in claim 2, further including a peak detector coupled to the output of said differentiating network to produce an indicating voltage, and an indicator coupled to the output of said peak detector.

4. In a control system for a sinusoidal oscillator, the combination comprising means to convert the oscillations from said oscillator into a saw tooth voltage, a periodic pulsatory voltage source, means to combine said saw tooth voltage and said pulsatory voltage to produce a saw tooth wave whose frequency corresponds to the difference in frequency between said saw tooth voltage and a component in the harmonic spectrum of said pulsatory voltage, a differentiating network, and means to apply said saw tooth wave to said network to produce an output voltage whose polarity depends on the sign of the frequency difference between said saw tooth voltage and said component.

5. In a control system for a sinusoidal oscillator, the combination comprising means to convert the oscillations from said oscillator into a saw tooth voltage, a periodic pulsatory voltage source, means to combine said saw tooth voltage and said pulsatory voltage to produce a saw tooth wave whose frequency corresponds to the difference in frequency between said saw tooth voltage and a component in the harmonic spectrum of said pulsatory voltage, a differentiating network, means to apply said saw tooth wave to said network to produce an output voltage whose polarity depends on the sign of the frequency difference between said saw tooth voltage and said component, means to detect said output voltage to produce a control voltage, and a frequency control device coupled to said oscillator and responsive to said control voltage for effecting synchronism between the frequency of said oscillator and said component.

6. In a control system for a sinusoidal oscillator the combination comprising means to convert the oscillations from said oscillator into a saw tooth voltage, a periodic pulsatory voltage source, a pulse modulator to combine said saw tooth voltage and said pulsatory voltage to produce resultant pulses amplitude modulated by a saw tooth wave whose frequency corresponds to the difference in frequency between said saw tooth voltage and a component in the harmonic spectrum of said pulsatory voltage, a low-pass filter coupled to said modulator to extract solely said saw tooth wave therefrom, a differentiating network, means to apply said saw tooth wave to said network to produce an output voltage whose polarity depends on the sign of the frequency difference between said saw tooth voltage and said component, a push-pull peak detector coupled to the output of said network to produce an indicating voltage, and an indicating device coupled to the output of said detector.

7. A system, as set forth in claim 6, wherein said low-pass filter has a cut-off frequency corresponding to one-half the periodicity of said component.

BONIFACIUS JOHANNES
VAN HARDENBERG.

REFERENCES CITED

The following references are of record in the file of this patent:

UNITED STATES PATENTS

| Number | Name | Date |
|---|---|---|
| 2,335,265 | Dodington | Nov. 30, 1943 |
| 2,391,776 | Fredendall | Dec. 25, 1945 |